US011236834B2

(12) United States Patent
Le et al.

(10) Patent No.: US 11,236,834 B2
(45) Date of Patent: Feb. 1, 2022

(54) DIAPHRAGM VALVES AND METHODS OF OPERATING SAME

(71) Applicant: Applied Materials, Inc., Santa Clara, CA (US)

(72) Inventors: Kenneth Le, Fremont, CA (US); Balarabe Mohammed, Union City, CA (US); Sohrab Zokaei, Los Altos, CA (US); Ming Xu, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 105 days.

(21) Appl. No.: 16/297,542

(22) Filed: Mar. 8, 2019

(65) Prior Publication Data

US 2020/0284360 A1 Sep. 10, 2020

(51) Int. Cl.
*F16K 7/14* (2006.01)
*F16K 31/06* (2006.01)
*F16K 31/122* (2006.01)

(52) U.S. Cl.
CPC ............ *F16K 7/14* (2013.01); *F16K 31/0693* (2013.01); *F16K 31/1226* (2013.01)

(58) Field of Classification Search
None
See application file for complete search history.

(56) References Cited

U.S. PATENT DOCUMENTS

| 4,475,711 A | 10/1984 | Rountry |
| 6,026,836 A | 2/2000 | Moenkhaus |
| 6,241,213 B1 | 6/2001 | Butler |
| 9,587,759 B2 * | 3/2017 | Matalon ............... F16K 7/16 |
| 10,006,664 B2 | 6/2018 | Bronson |
| 2001/0028049 A1 | 10/2001 | Mamyo |
| 2003/0145891 A1 | 8/2003 | Buescher et al. |
| 2005/0011555 A1 | 1/2005 | Maula et al. |

(Continued)

FOREIGN PATENT DOCUMENTS

| WO | WO-2009114841 A2 * | 9/2009 | ............ F16K 41/12 |
| WO | 2018037993 A1 | 3/2018 | |

OTHER PUBLICATIONS

Ye et al., U.S. Appl. No. 15/936,428, titled: "Methods, Systems, and Apparatus for Mass Flow Verification Based on Rate of Pressure Decay," filed Mar. 26, 2018.

(Continued)

*Primary Examiner* — Daphne M Barry
(74) *Attorney, Agent, or Firm* — Lowenstein Sandler LLP

(57) ABSTRACT

A diaphragm valve includes an inlet port, an outlet port, and a valve seat proximate one of the inlet port or the outlet port. A diaphragm is positioned relative to the valve seat and has an open state wherein the diaphragm is spaced from the valve seat to enable a fluid path between the inlet port and the outlet port. The diaphragm has a closed state wherein the diaphragm is seated on the valve seat to block the fluid path. A coupling member is coupled between the diaphragm and a reciprocatable member and configured to maintain the diaphragm in the open state while the reciprocatable member is in the opened position. The coupling member may have a clearance gap relative to the reciprocatable member when the reciprocatable member is in the closed position. Other diaphragm valves and methods of operating diaphragm valves are also disclosed.

19 Claims, 5 Drawing Sheets

(56) References Cited

U.S. PATENT DOCUMENTS

| | | |
|---|---|---|
| 2007/0048869 A1 | 3/2007 | Lee et al. |
| 2014/0021392 A1 | 1/2014 | Matalon |
| 2015/0152753 A1* | 6/2015 | Hashimoto ............. C22C 38/24 251/359 |
| 2016/0025688 A1* | 1/2016 | Gamache ................ F16K 11/00 137/2 |
| 2017/0271183 A1 | 9/2017 | Brashear et al. |
| 2017/0271184 A1 | 9/2017 | Brashear et al. |
| 2017/0370763 A1 | 12/2017 | Brashear et al. |

OTHER PUBLICATIONS

International Search Report and Written Opinion for International Application No. PCT/US2020/020210, dated Jun. 22, 2020, 11 pages.

* cited by examiner

DIAPHRAGM VALVES AND METHODS OF OPERATING SAME

FIELD

Embodiments of the present disclosure relate to valves and methods of operating valves, and more particularly to diaphragm valves.

BACKGROUND

Valves are used to control the flow of fluids in a variety of applications. Some valves include an inlet port and an outlet port with a flexible diaphragm located between the ports and positioned adjacent to a valve seat. In operation, the diaphragm flexes to a closed state against the valve seat to prevent the flow of fluid between the inlet and outlet ports. The diaphragm flexes to an open state away from the valve seat to enable fluid flow between the ports.

Some valves operating under vacuum can include undesirable flow characteristics. Accordingly, improved valves and methods for providing fluid flow control in a vacuum environment are sought.

SUMMARY

In an embodiment, a diaphragm valve is provided. The diaphragm valve includes an inlet port; an outlet port; a valve seat proximate one of the inlet port or the outlet port; a diaphragm positioned relative to the valve seat, the diaphragm having an open state wherein the diaphragm is spaced from the valve seat to enable a fluid path between the inlet port and the outlet port, and the diaphragm having a closed state wherein the diaphragm is seated on the valve seat to block the fluid path; a reciprocatable member coupled to the diaphragm and configured to transition between an open position and a closed position, the open position moving the diaphragm to the open state, and the closed position moving the diaphragm to the closed state; and a coupling member coupled between the diaphragm and the reciprocatable member.

In another embodiment, a diaphragm valve is provided. The diaphragm valve includes an inlet port; an outlet port; a valve seat proximate one of the inlet port or the outlet port; a diaphragm positioned relative to the valve seat, the diaphragm having an open state wherein the diaphragm is spaced from the valve seat to enable a fluid path between the inlet port and the outlet port, and the diaphragm having a closed state wherein the diaphragm is seated on the valve seat to block the fluid path; a reciprocatable member coupled to the diaphragm and configured to transition between an open position and a closed position, the open position moving the diaphragm to the open state, and the closed position moving the diaphragm to the closed state; a coupling member coupled between the diaphragm and the reciprocatable member; and an insert located between the reciprocatable member and the diaphragm, the insert having a channel wherein the coupling member passes through the channel.

In another aspect, a method of operating a diaphragm valve is provided. The method includes moving a reciprocatable member to an open position; pulling a diaphragm to an open state in response to moving the reciprocatable member to the open position, wherein the pulling is performed by pulling the diaphragm with a coupling member coupled between the reciprocatable member and the diaphragm; and moving the reciprocatable member to a closed position, wherein the diaphragm moves to a closed state in response to moving the reciprocatable member to the closed position.

Numerous other aspects and features are provided in accordance with these and other embodiments of the disclosure. Other features and aspects of embodiments of the disclosure will become more fully apparent from the following detailed description, the claims, and the accompanying drawings.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

DETAILED DESCRIPTION

Figure 1A:
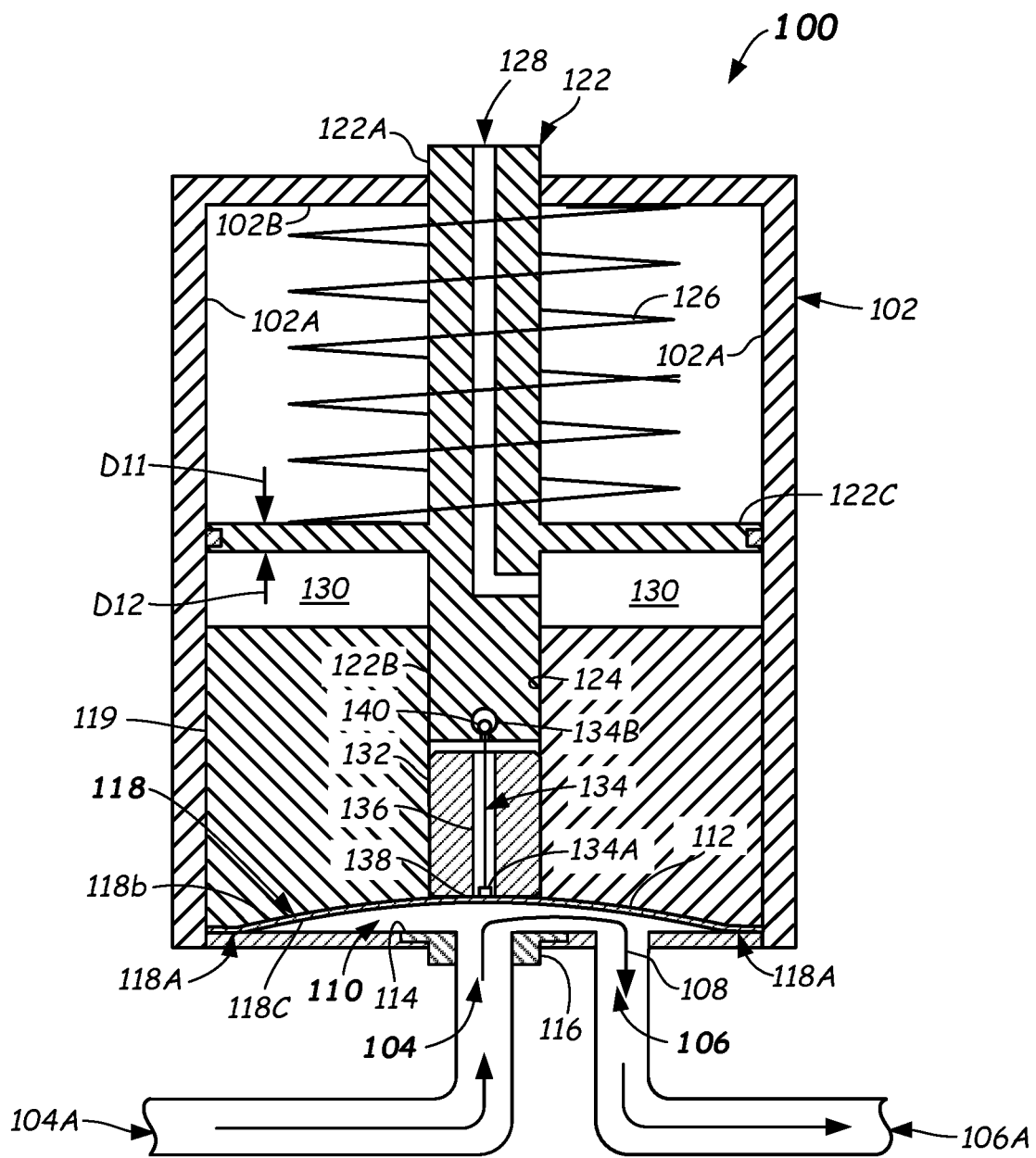
FIG. 1A illustrates a cross-sectioned side view of a diaphragm valve, such an ultrahigh purity (UHP) diaphragm valve, in an open state according to the disclosed embodiments.

Reference will now be made in detail to the example embodiments provided, which are illustrated in the accompanying drawings. Features of the various embodiments described herein may be combined with each other unless specifically noted otherwise.

Some valves operating at high temperature and under high vacuum have demonstrated a flow conductance reduction between the ports. Such flow conductance reduction may be caused by the movement between the valve seat and the diaphragm. Under vacuum conditions, vacuum pressure exerted on the diaphragm by fluids in the ports can be below ambient pressure and thus can pull the diaphragm towards the valve seat. The distance between the valve seat and the diaphragm is reduced by the vacuum pressure when the diaphragm is in the open state and flow conductance through the valve can therefore be reduced.

The following disclosure describes ultra-high purity (UHP) diaphragm valves, but the concepts and features disclosed herein may be applied to other valve types, such as other types of diaphragm valves. UHP diaphragm valves and other valves may operate under low or high temperature conditions, high vacuum conditions, or both high temperature and high vacuum conditions. A diaphragm valve may include an inlet port and an outlet port. One or both of the inlet port and the outlet port may be coupled to a line that operates at a vacuum relative to ambient conditions of the diaphragm valve.

A diaphragm valve may include a diaphragm located in a chamber. Both an inlet port and an outlet port may be fluidly coupled to the chamber. A valve seat may be located proximate the diaphragm and may encompass one of the inlet port or the outlet port. The diaphragm may seal against the valve seat to close the port encompassed by the valve seat, which blocks fluid flow between the inlet port and the outlet port. In this sealed position of the diaphragm, the diaphragm and the diaphragm valve are referred to as being in a "closed state." In another position, the diaphragm can be positioned a distance from the valve seat to enable fluid flow between the inlet port and the outlet port. In this position of the diaphragm, the diaphragm and the diaphragm valve are referred to as being in an "open state."

When the valve operates under high vacuum, one or both of the inlet port and the outlet port are coupled to a vacuum source that is at negative pressure or vacuum relative to the atmosphere. This pressure differential exerts a force on the diaphragm to pull the diaphragm toward the valve seat. The force may deform the diaphragm when the diaphragm is in the open state, which can thus impede fluid flow between the inlet port and the outlet port. The impeded flow is referred to herein as a reduction in the conductance (Cv) of the valve. In some situations, the force exerted on the diaphragm in the open state is high enough that the force may deform or move the diaphragm so as to seal against the valve seat and block fluid flow between the inlet port and the outlet port.

The improved diaphragm valves, such as UHP diaphragm valves, disclosed herein may prevent the diaphragm from moving or deforming under vacuum conditions when in at least the open state, which therefore improves the overall conductance of the valve and solves the low conductance problem of prior art valves. Further details of various embodiments of the improved diaphragm valves in accordance with embodiments of the disclosure are described with reference to FIGS. 1A-4 herein.

Figure 1B:
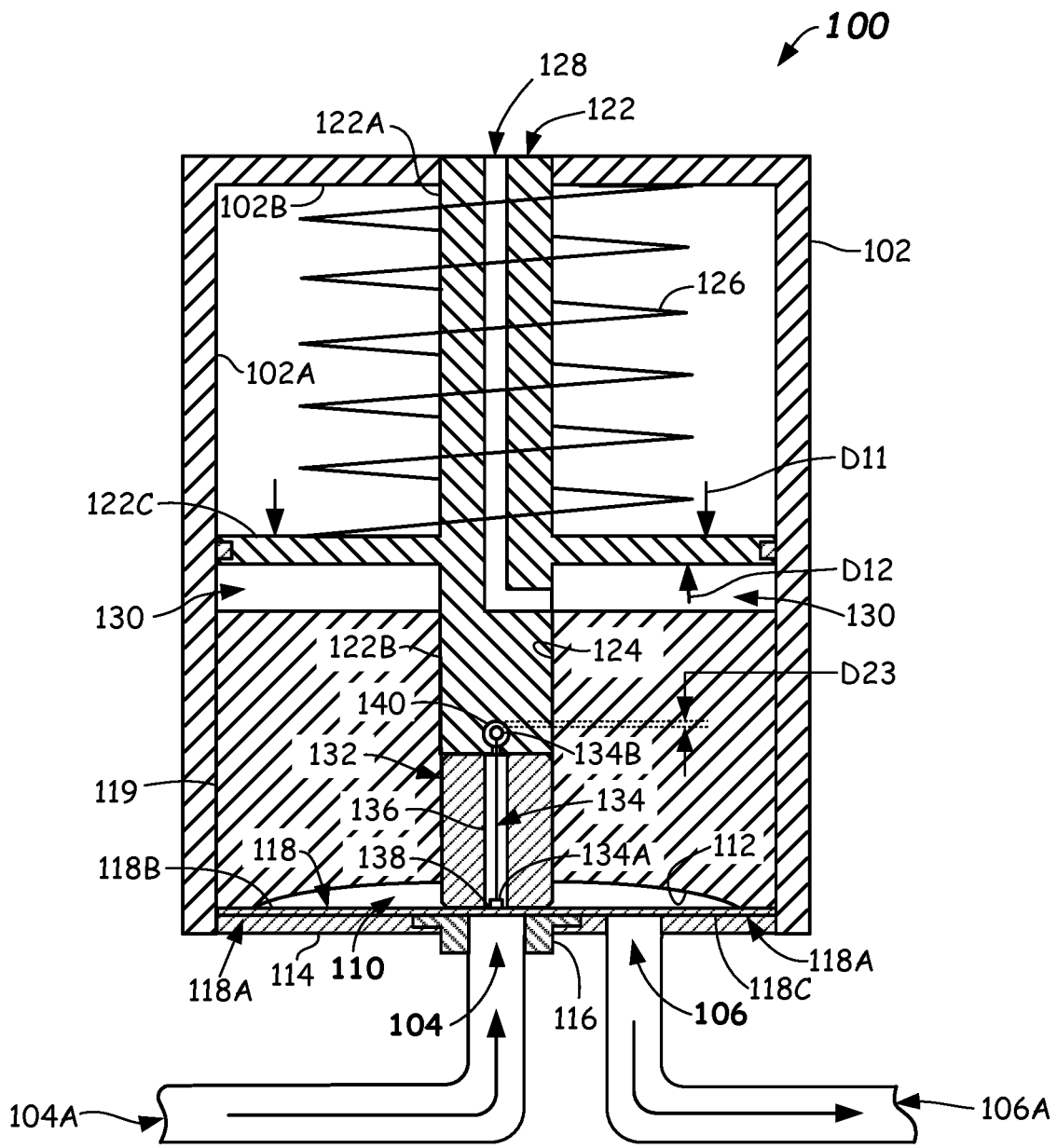
FIG. 1B illustrates a cross-sectioned side view of a diaphragm valve, such as an UHP diaphragm valve, in a closed state according to the disclosed embodiments.

FIG. 1A illustrates a cross-sectioned side view of an embodiment of diaphragm valve 100, such as an UHP diaphragm valve, shown in an open state according to disclosed embodiments. FIG. 1B illustrates a cross-sectioned side view of an embodiment of the diaphragm valve 100 shown in a closed state according to disclosed embodiments. The diaphragm valve 100 includes a body 102 to which an inlet port 104 and an outlet port 106 may be coupled. The inlet port 104 and the outlet port 106 may be interchanged in some embodiments. An inlet line 104A may be coupled to the inlet port 104 and an outlet line 106A may be coupled to the outlet port 106, which may each be any suitable conduit. When the diaphragm valve 100 is in the open state, a fluid path 108 may be formed and located between the inlet port 104 and the outlet port 106. For example, the fluid path 108 may be at least partially formed within a chamber 110. The chamber 110 may be at least partially defined by an upper wall 112 and a lower wall 114.

A valve seat 116 may be located proximate the lower wall 114 and may encompass the inlet port 104. In some embodiments, the valve seat 116 may extend through the lower wall 114 at least to some extent. In some embodiments, at least a portion of the valve seat 116 may extend from the lower wall 114 and into the chamber 110. The valve seat 116 may be integrally formed with or be a portion (e.g., around an opening) of at least one of the inlet port 104 or the outlet port 106. The valve seat 116 may be made of any suitable material, such as a metal or plastic (e.g., stainless steel; nickel-based steel alloys; nickel, molybdenum, and chromium-containing alloys; nickel; perfluoroalkoxy (PFA), polychlorotrifluoroethylene (PCTFE); Polyimide (PI); or other polytetrafluoroethylene (PTFE)-relative materials; and the like). The valve seat 116 may be made of other materials and can have other configurations.

A diaphragm 118 may be located within the chamber 110 and may be movable between an open state and a closed state as described herein. The diaphragm 118 is illustrated in FIG. 1A is shown in an open state and the diaphragm 118 is shown in FIG. 1B in a closed state. When the diaphragm 118 is in the open state (FIG. 1A), the diaphragm 118 may at least partially define a fluid path 108 between the inlet port 104 and the outlet port 106. Accordingly, the diaphragm 118 may control the conductance of fluid flowing between the inlet port 104 and the outlet port 106.

The diaphragm 118 may be comprised of a flexible and fluid-tight material that allows for the diaphragm 118 to move or flex between the open state and the closed state within the chamber 110. In some embodiments, the diaphragm 118 may be comprised of a metal, such as an alloy that has corrosive resistance and exhibits high strength, ductility, and good fatigue life while operating under high temperatures. For example, the metal may comprise a Co—Cr—Ni alloy, which can include 39-41% Cobalt, 19-21% Chromium, 14-16% Nickel, 11.3-20.5% Iron, 6-8% Molybdenum, and 1.5-2.5% Manganese. Other suitable alloys may be used. In some embodiments, the diaphragm valve 100 may operate in temperature ranges of from 20° C. to 500° C., although other operating regimes are possible. The diaphragm 118 may be comprised of a single layer of metal (e.g., alloy) in some embodiments. Further, the single layer of metal comprising the diaphragm 118 may be reinforced with another material. Moreover, the diaphragm 118 may be comprised of multiple layers, leafs, or overlapping regions, such as a metal bellows. The diaphragm 118 may be made up of more than one alloy metal. The diaphragm 118 may be made of other materials and other configurations of materials.

The diaphragm 118 may include an outer periphery 118A, a first surface 118B, and a second surface 118C. The outer periphery 118A may be sealed to the lower wall 114. For example, the outer periphery 118A may be adhered to the lower wall 114, such as by welding, adhesive, or the like. In some embodiments, a rigid member, such as sleeve 119 or the like, may mechanically fasten and seal the outer periphery to the lower wall 114. In some embodiments, the diaphragm 118 may be secured to the lower wall 114 by clamping the diaphragm 118 between the lower wall 114 and the sleeve 119, which can be part of or rigidly coupled to the body 102. The outer periphery 118A may be secured to the lower wall 114 so that the diaphragm 118 is securely positioned over the fluid path 108 as well as over the inlet port 104 and/or the outlet port 106. A center portion of the diaphragm 118 may be positioned relative to (e.g., above) the valve seat 116, for example.

The diaphragm 118 may be configured to bias to a generally convex shape or more convex shape when viewed from the first surface 118B as shown in FIG. 1A, which is when the diaphragm 118 is in the open state. As shown in FIG. 1A, while in the open state, the first surface 118B of the diaphragm 118 may be positioned proximate or against the upper wall 112 of the chamber 110. When the diaphragm 118 is in the open state, the fluid path 108 is maximized and provides for a high conductance (low resistance) between the inlet port 104 and the outlet port 106. Alternatively, as shown in FIG. 1B, when the diaphragm 118 is provided in the closed state, the second surface 118C of the diaphragm 118 may be positioned against or sealed against the valve seat 116. Thus, when the diaphragm 118 is in the closed state, the fluid path 108 is at least partially blocked (as compared to the opened state), which prevents/blocks or substantially minimizes or reduces (as compared to the open state) fluid flow between the inlet port 104 and the outlet port 106. In the closed state of the depicted embodiment, the diaphragm 118 may fully or partially block the inlet port 104. In some embodiments, when the diaphragm 118 is in the closed state, the diaphragm 118 may fully or partially block one or both of the inlet port 104 and the outlet port 106.

The diaphragm valve 100 may further include a reciprocatable member 122. The reciprocatable member 122 may include a first portion 122A, a second portion 122B, and a piston 122C. The first portion 122A may be coupled to or integral with the piston 122C in some embodiments, which extends perpendicularly from the center to an inner surface 102A of the body 102. The inner surface 102A may be a cylindrical wall and the piston 122C is operable to slide in a sealed fashion against the cylindrical wall. The second portion 122B of the reciprocatable member 122, which may be integral with the first portion 122A, may be positioned and reciprocal within a channel 124 formed within the body 102, such as within a sleeve 119 thereof. The channel 124 may extend longitudinally within the body 102, such as within sleeve 119. The reciprocatable member 122 may transition within the channel 124 between an open position (FIG. 1A) and a closed position (FIG. 1B) as described herein.

A spring 126 (shown unhatched) may be located between the piston 122C and a wall 102B of the body 102. The spring 126 may bias the reciprocatable member 122 and the piston 122C thereof in a direction D11 towards the closed state. The spring force exerted by the spring 126 may be strong enough to flex the diaphragm 118 to the closed state as shown in FIG. 1B.

The reciprocatable member 122 may include a fluid channel 128 extending through the first portion 122A of the reciprocatable member 122. The fluid channel 128 may couple to a chamber 130 at least partially formed by the piston 122C and the inner surface 102A and sleeve 119. A positive fluid pressure (e.g., positive air pressure) is created within the chamber 130 as a result of forcing fluid (e.g., clean dry air) through the fluid channel 128 and into the chamber 130. The pressure created in the chamber 130 forces the reciprocatable member 122 in a direction D12 (e.g., an upward direction) away from the valve seat 116 and towards the open position.

An insert 132 may be included within the channel 124 between the second portion 122B of the reciprocatable member 122 and the diaphragm 118. The insert 132 may be configured to move with the reciprocatable member 122 as it transitions in the channel 124 between the open state and the closed state. The insert 132 may reduce the impact force upon the diaphragm 118 during transition to the closed state, which may extend of the life of the diaphragm life. The insert 132 may be made from a metal or a plastic material, such as stainless steel, polytetrafluoroethylene (PTFE), or polychlorotrifluoroethylene (PCTFE), combinations, and the like, for example.

As shown in FIG. 1A, when the reciprocatable member 122 transitions to the open position, the reciprocatable member 122 and the insert 132 transition in the direction D12 away from the valve seat 116 allowing the diaphragm 118 to flex to the open state. As shown in FIG. 1B, when the reciprocatable member 122 transitions to the closed position, the reciprocatable member 122 and the insert 132 transition within the channel 124 in the direction D11 towards the valve seat 116 forcing the diaphragm 118 to flex to the closed state.

The diaphragm valve 100 may further include a coupling member 134 including a first end 134A and a second end 134B located opposite the first end 134A. The coupling member 134 may couple the diaphragm 118 to the reciprocatable member 122. The insert 132 may include a channel 136 extending between the second portion 122B of the reciprocatable member 122 and the diaphragm 118 through which the coupling member 134 may be routed. The coupling member 134 may pull the diaphragm 118 to the open state when the reciprocatable member 122 transitions to the open position as shown in FIG. 1A. Additionally, the coupling member 134 may pull the diaphragm 118 while the reciprocatable member 122 is in the open position to prevent or minimize flexing of the diaphragm 118 towards to the valve seat 116. Thus, the reciprocatable member 122 and the coupling member 134 may maintain the diaphragm 118 in the open state when the diaphragm valve 100 is operating in vacuum conditions.

The first end 134A of the coupling member 134 may be coupled to a location 138 on the diaphragm 118. In the embodiments shown in FIGS. 1A and 1B, the location 138 is centered on the diaphragm 118 and can be above the valve seat 116. For example, the location 138 may be located above a center point of the valve seat 116. In other embodiments, the first end 134A may be coupled to several locations on the diaphragm 118 and/or to a large area of the diaphragm 118.

The second end 134B of the coupling member 134 may be loosely coupled, such as to a location on or within the second portion 122B of the reciprocatable member 122. In the embodiments shown in FIGS. 1A and 1B, the mounting of the second end 134B to the reciprocatable member 122 is a loose mounting connection that provides for limited displacement (e.g., a clearance gap D23—FIG. 1B) of the coupling member 134 relative to the reciprocatable member 122 and the diaphragm 118. The loose mounting of the coupling member 134 relative to the reciprocatable member 122 provides some limited slop that prevents the coupling member 134 from damaging (e.g., piercing) the diaphragm 118 when the reciprocatable member 122 is moved to and into the closed position. For example, when the reciprocatable member 122 is in the closed position, the coupling member 134 does not exert any appreciable compression force on the diaphragm 118 from the reciprocatable member 122 pushing on the coupling member 134. However, the insert 132 exerts a closing force on the diaphragm 118 wherein the force is substantially large than any force exerted by the coupling member 134. The clearance gap D23 may be provided at the second end 134B by a small diameter pin or other member received in a larger bore 140 or hole, for example. Other suitable means for providing a clearance gap D23 can be provided.

In some embodiments, the coupling member 134 may be made of a rigid material. In other embodiments, the coupling member 134 may be made of a flexible material, such as a cable, or a combination of rigid and flexible materials such that a static buckling strength of the coupling member 134 thereof is very low. In some embodiments, the coupling member 134 may be made of the same material and/or integral with as the diaphragm 118. In other embodiments, the coupling member 134 and the diaphragm 118 may be formed of different materials.

Figure 2A:
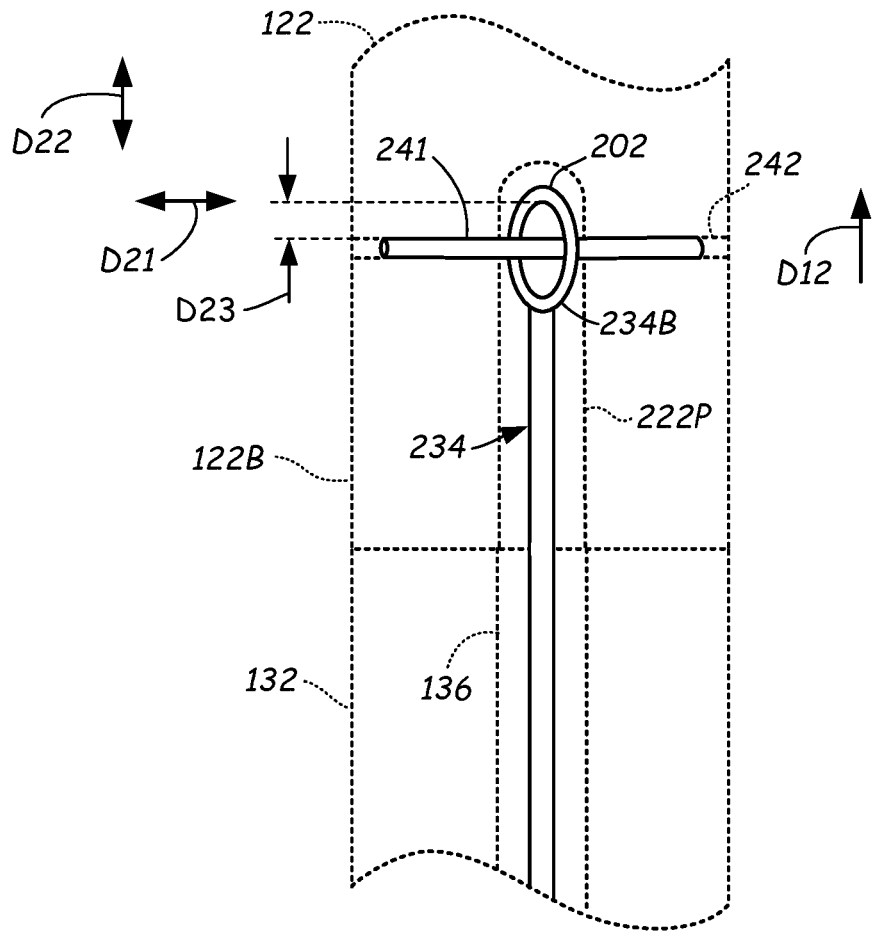
FIG. 2A illustrates a side view of a coupling member coupled to a reciprocatable member of a diaphragm valve, such as an UHP diaphragm valve, according to the disclosed embodiments.

FIG. 2A illustrates a side view of an alternative embodiment of a coupling member 234 coupled between the reciprocatable member 122 (shown dotted) and the diaphragm (not shown). The second end 234B of the coupling member 234 may be coupled to the second portion 122B of the reciprocatable member 122 via a pin 241 received in a cross bore 242 of the second portion 122B, for example. In the embodiment of FIG. 2A, the second end 234B of the coupling member 234 may include a loop member 202 within a pocket 222P. The pin 241 may pass through a larger hole on the loop member 202 and may be secured in the second portion 122B of the reciprocatable member 122. For example, the pin 241 may be secured within the reciprocatable member 122 with one or more set screws or any other fasteners (not shown). The set screws or fasteners may be located relative to the reciprocatable member 122 so as not to impede the movement of the reciprocatable member 122 within the channel 124 (FIG. 1A). For example, set screws (not shown) may be recessed within an outer surface of the reciprocatable member 122 and may secure the pin 241 within the reciprocatable member 122. In some embodiments, the pin 241 may be a screw or other fastener.

As shown in FIG. 2A the outer diameter of the pin 241 may be smaller than the inner diameter of the loop member 202. The difference in diameters enables the coupling member 134 to move or be displaced relative to the pin 241 and the reciprocatable member 122. The loop member 202 may interface with the pin 241 in a manner that provides for limited clearance gap D23 of the coupling member 134 relative to the reciprocatable member 122 in a first direction D21. The loop member 202 may also interface with the pin 241 in a manner that provides for a displacement (e.g., clearance gap D23) in a second direction D22 that may be orthogonal to the first direction D21. In some embodiments, the clearance gap D23 may be between 2% and 15% of the movement of the diaphragm 118. In some embodiments, the clearance gap D23 may be between 2% and 12%. The clearance gap D23 may have other values.

While the diaphragm 118 (FIG. 1A) is in the open state, the limited displacement of the coupling member 134 provided by the loop member 202 and the pin 241 allows for displacement of the diaphragm 118 under operating conditions while maintaining at least a minimum distance between the diaphragm 118 and the valve seat 116. The diaphragm displacement for the open and closed states may be slightly smaller than the displacement between the loop member 202 and the pin 241 in order to prevent touch tension that could cause the material stress of the diaphragm 118, the pin 241, and/or the loop member 202.

For example, when the diaphragm 118 is in the open state, the pin 241 may pull the loop member 202 in the direction D12. There may be a small stack up tolerance without constant pulling of the diaphragm 118 into the insert 132. When the diaphragm 118 is in the closed state, the pin 241 may not be pressing against an edge (e.g., a bottom edge) of the loop member 202 so as to avoid creating any compressing force on the coupling member 234. While the diaphragm 118 is in the closed state, the clearance gap D23 of the coupling member 234 provided by the loop member 202 and the pin 241 may ensure that the coupling member 234 does not damage the diaphragm 118. For example, when the reciprocatable member 122 transitions to the closed state, the clearance gap D23 (slop) may prevent the coupling member 234 from damaging (e.g., piercing) the diaphragm 118.

As shown in FIG. 2A, the channel 136 may have a diameter that is greater than the diameter of the coupling member 234. In embodiments wherein the coupling member 134, 234 includes a flexible member, such as a cable, the displacement of the coupling member 134, 234 may occur at least partially within the channel 136 and/or pocket 222P. For example, slack in the coupling member 134, 234 may be present within the channel 136 when the reciprocatable member 122 is in the closed position.

Figure 2B:
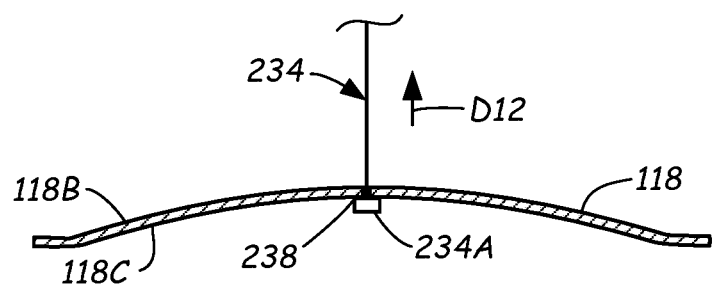
FIG. 2B illustrates a side view of a coupling member coupled to a surface of a diaphragm of diaphragm valve, such as an UHP diaphragm valve, according to the disclosed embodiments.

FIG. 2B illustrates a cross-sectioned side view of a coupling member 234 coupled to a location 238 located on the second surface 118C of the diaphragm 118. The coupling member 234 extends in the direction D12 through the first surface 118B of the diaphragm 118 and towards the reciprocatable member 122. In some embodiments, the first end 234A of the coupling member 234 may be welded to the location 238 located on either the first surface 118B or the second surface 118C (as shown) of the diaphragm 118. Other suitable mechanisms may be used to attach the coupling member 234 to the diaphragm 118.

As shown in FIG. 1A, when the reciprocatable member 122 is in the open position and the diaphragm 118 is in the open state, the coupling member 134 may pull on the diaphragm 118 in the direction D12. By pulling on the diaphragm 118, the coupling member 134 may counter a vacuum condition pulling on the diaphragm 118 in the direction D11 towards the valve seat 116. For example, vacuum sources coupled to one or both of the inlet line 104A or the outlet line 106A may exert a force on the diaphragm 118 to pull the diaphragm 118 toward the valve seat 116. As such, a minimum distance may be maintained between the diaphragm 118 and the valve seat 116 while the reciprocatable member 122 is in the open position. In some embodiments, the minimum distance may be maintained between the diaphragm 118 and the valve seat 116 while the diaphragm 118 is under vacuum conditions ranging between about 1.0 milliTorr and 500 Torr. In some embodiments, the minimum distance range may provide for a minimum valve coefficient of at least 0.8 Cv when the diaphragm valve 100 is in the open state. The minimum distance may be in a range from 0.5 mm to 1.5 mm or in a range from 0.9 mm to 1.0 mm, for example. The diaphragm valve 100 may operate under other conditions. For example, the open state of the diaphragm valve 100 may include a range of states including partially open and fully open states.

As shown in FIG. 1B, when the reciprocatable member 122 is in the closed position and the diaphragm 118 is in the closed state, the insert 132 may push against the first surface 118B of the diaphragm 118 in the direction D11. The force provided by the insert 132 against the diaphragm 118 may seal the second surface 118C of the diaphragm 118 against the valve seat 116. For example, the spring force exerted by the spring 126 when the chamber 130 is devoid of positive fluid pressure may provide a force on the insert 132 in the direction D11. This force may fully close the fluid path 108 and prevent any flow of fluids between the inlet port 104 and the outlet port 106 while the diaphragm valve 100 is in the closed state. Thus, the spring 126 provides a normally close valve state.

Figure 3A:
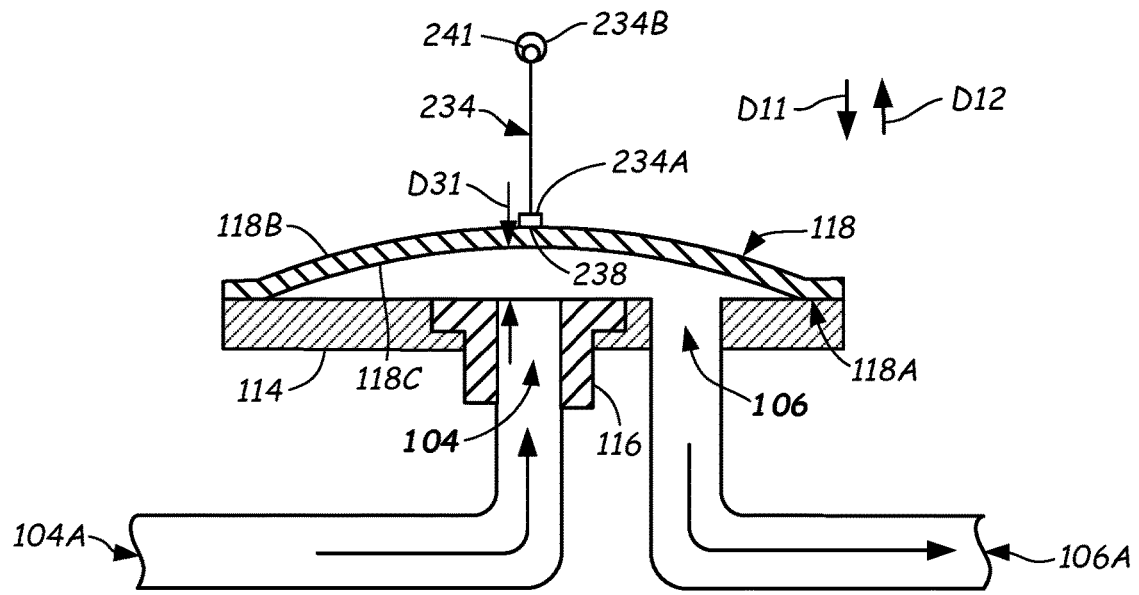
FIG. 3A illustrates a cross-sectioned side view of a diaphragm of a diaphragm valve, such as an UHP diaphragm valve, in an open state according to the disclosed embodiments.

FIG. 3A illustrates a cross-sectioned side view of the coupling member 234 coupled to the diaphragm 118, which is in the open state according to disclosed embodiments. In the embodiment of FIG. 3A, the first end 234A of the coupling member 234 is coupled to the location 238 located on the first surface 118B of the diaphragm 118. The coupling member 234 extends in the direction D12 towards the reciprocatable member (not shown). The vacuum forces originating within the inlet port 104 and/or the outlet port 106 while the diaphragm 118 is in the open state may be countered by the coupling member 234. For example, the coupling member 234 may pull on the diaphragm 118 in the direction D12. The coupling member 234 may therefore limit how far the diaphragm 118 is drawn in the direction D11 towards the valve seat 116 as a result of the vacuum forces. As such, the coupling member 234 may maintain a minimum distance D31 (e.g., a predefined minimum distance) between the diaphragm 118 and the valve seat 116. The minimum distance D31 may be greater than or equal to about 1.0 mm so as to minimize flow restriction.

Figure 3B:
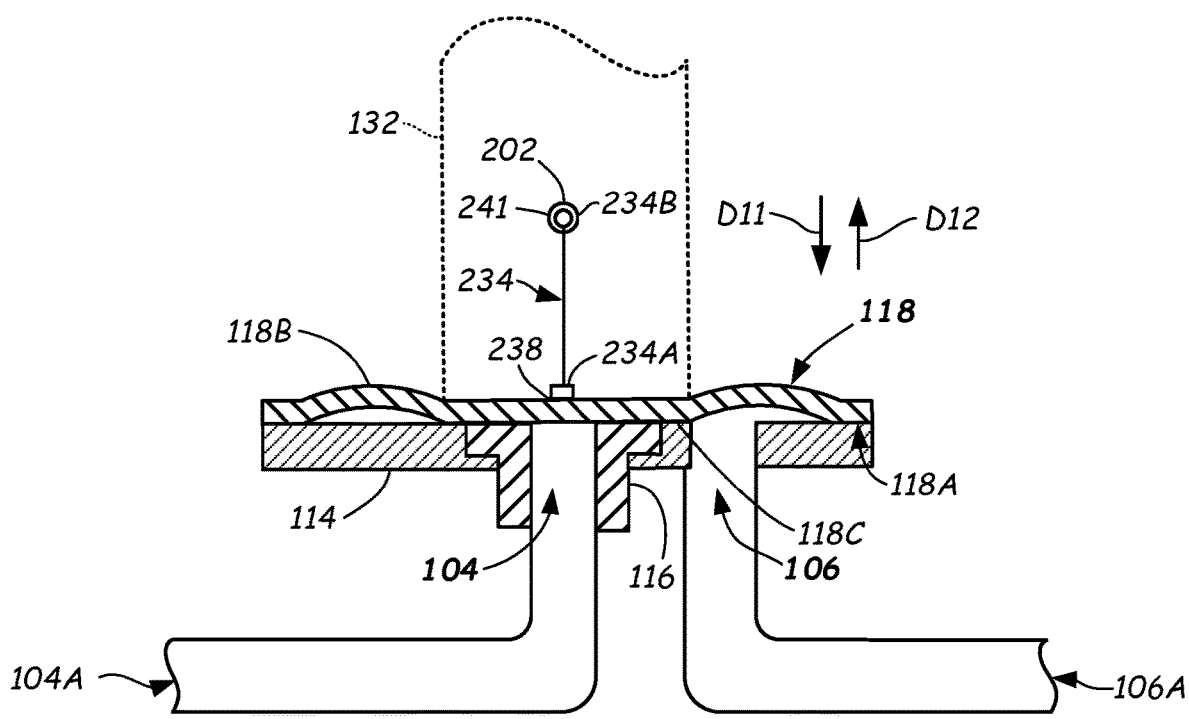
FIG. 3B illustrates a cross-sectioned side view of a diaphragm of a diaphragm valve, such as an UHP diaphragm valve, in a closed state according to the disclosed embodiments.

FIG. 3B illustrates a cross-sectioned side view of an embodiment of coupling member 234 coupled to the diaphragm 118, wherein the diaphragm 118 is in the closed state. In the embodiment of FIG. 3B, the insert 132 (shown dotted) exerts a force on the diaphragm 118 in the direction D11, which flexes or deforms the diaphragm 118 so that the second surface 118C of the diaphragm 118 is sealed against the valve seat 116. The clearance gap D23 between the coupling member 234 and the diaphragm 118 may prevent the coupling member 234 from damaging (e.g., piercing) the diaphragm 118.

Figure 4:
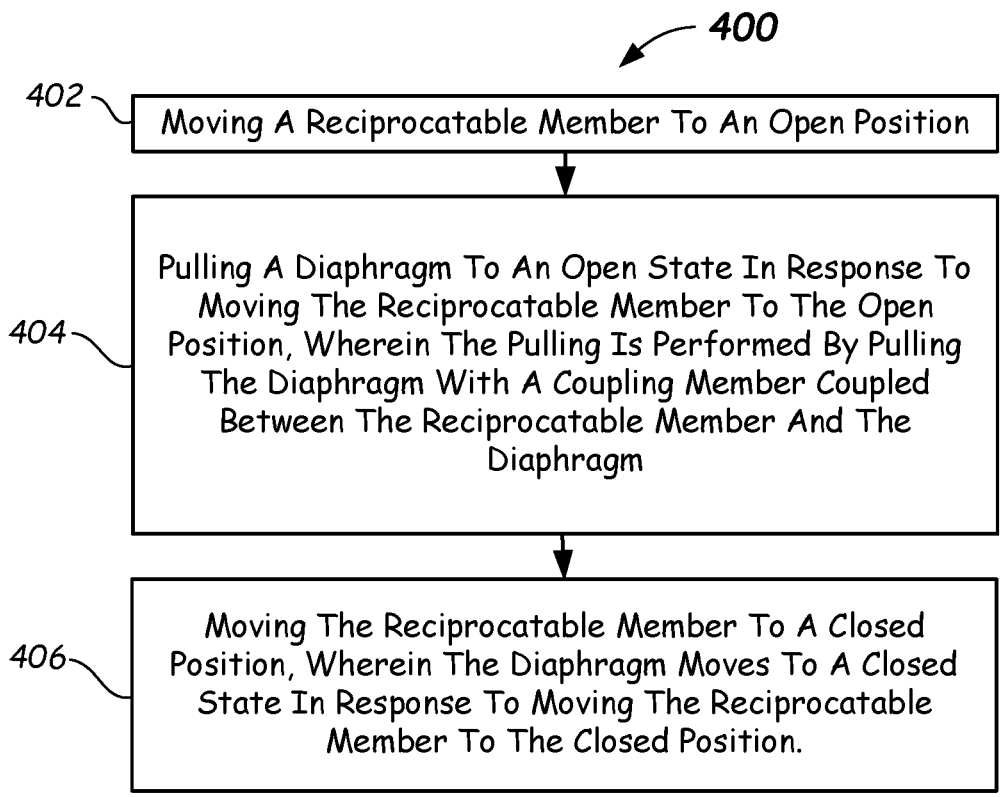
FIG. 4 illustrates a flowchart depicting a method of operating a diaphragm valve, such as an UHP diaphragm valve, according to the disclosed embodiments.

FIG. 4 illustrates a flowchart depicting a method 400 of operating a diaphragm valve (e.g., diaphragm valve 100) according to the disclosed embodiments. The method includes, at 402, moving a reciprocatable member (e.g., reciprocatable member 122) to an open position. The method includes, at 404, pulling a diaphragm (e.g., diaphragm 118) to an open state in response to moving the reciprocatable member to the open position, wherein the pulling is performed by pulling the diaphragm with a coupling member (e.g., coupling member 134, 234) coupled between the reciprocatable member and the diaphragm. The method includes, at 406, moving the reciprocatable member to a closed position, wherein the diaphragm moves to a closed state in response to moving the reciprocatable member to the closed position.

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limited to the particular apparatus and/or methods disclosed, but, to the contrary, the intention is to cover all modifications, equivalents, and alternatives falling within the scope of the claims.

What is claimed is:

1. A diaphragm valve, comprising:
   an inlet port;
   an outlet port;
   a valve seat proximate one of the inlet port or the outlet port;
   a diaphragm positioned relative to the valve seat, the diaphragm having an open state wherein the diaphragm is spaced from the valve seat to enable a fluid path between the inlet port and the outlet port, and the diaphragm having a closed state wherein the diaphragm is seated on the valve seat to block the fluid path;
   a reciprocatable member coupled to the diaphragm and configured to transition between an open position and a closed position, the open position moving the diaphragm to the open state, and the closed position moving the diaphragm to the closed state;
   and
   a coupling member coupled between the diaphragm and the reciprocatable member, wherein the coupling member has a first end and a second end opposite the first end, the first end coupled to the diaphragm and the second end coupled to the reciprocatable member via a connection that provides displacement of the coupling member relative to at least one of the reciprocatable member or the diaphragm, and the second end of the coupling member including a loop member and a pin extending through the loop member.

2. The diaphragm valve of claim 1 wherein the coupling member is configured to pull the diaphragm to the open state and maintain the diaphragm at a predefined minimum distance from the valve seat when the reciprocatable member is in the open position.

3. The diaphragm valve of claim 1 wherein the second end provides for a clearance gap of the coupling member relative to the reciprocatable member.

4. The diaphragm valve of claim 1 wherein the coupling member is rigid.

5. The diaphragm valve of claim 1 wherein the coupling member is flexible.

6. The diaphragm valve of claim 1 wherein the diaphragm and the coupling member are formed from a same material.

7. The diaphragm valve of claim 1 wherein the diaphragm is comprised of a Co—Cr—Ni alloy.

8. The diaphragm valve of claim 1 wherein the coupling member is configured to maintain the diaphragm in the open state while the reciprocatable member is in the open position, and wherein the coupling member has a clearance gap relative to the reciprocatable member when the reciprocatable member is in the closed position.

9. The diaphragm valve of claim 1 further comprising an insert positioned between the diaphragm and the reciprocatable member, the insert configured to press the diaphragm against the valve seat when the reciprocatable member is in the closed position.

10. The diaphragm valve of claim 1 further comprising a fluid channel extending through the reciprocatable member and to a chamber, wherein positive fluid pressure in the chamber forces the reciprocatable member to the open position.

11. The diaphragm valve of claim 1 wherein the coupling member maintains a minimum distance between the diaphragm and the valve seat under vacuum conditions ranging between 1.0 milliTorr and 500 Torr.

12. The diaphragm valve of claim 1 wherein the coupling member maintains a minimum distance between the diaphragm and the valve seat under temperature conditions between 20° C. and 500° C.

13. The diaphragm valve of claim 1 wherein the diaphragm is comprised of multiple layers.

14. The diaphragm valve of claim 1 wherein the open state of the diaphragm includes a range of states including partially open and fully open states.

15. The diaphragm valve of claim 1 further comprising a spring configured to bias the reciprocatable member in the closed position.

16. A diaphragm valve, comprising:
- an inlet port;
- an outlet port;
- a valve seat proximate one of the inlet port or the outlet port;
- a diaphragm positioned relative to the valve seat, the diaphragm having an open state wherein the diaphragm is spaced from the valve seat to enable a fluid path between the inlet port and the outlet port, and the diaphragm having a closed state wherein the diaphragm is seated on the valve seat to block the fluid path;
- a reciprocatable member coupled to the diaphragm and configured to transition between an open position and a closed position, the open position moving the diaphragm to the open state, and the closed position moving the diaphragm to the closed state;
- a coupling member coupled between the diaphragm and the reciprocatable member; and
- an insert located between the reciprocatable member and the diaphragm, the insert having a channel wherein the coupling member passes through the channel.

17. A diaphragm valve, comprising:
- an inlet port;
- an outlet port;
- a valve seat proximate one of the inlet port or the outlet port;
- a diaphragm positioned relative to the valve seat, the diaphragm having an open state wherein the diaphragm is spaced from the valve seat to enable a fluid path between the inlet port and the outlet port, and the diaphragm having a closed state wherein the diaphragm is seated on the valve seat to block the fluid path;
- a reciprocatable member coupled to the diaphragm and configured to transition between an open position and a closed position, the open position moving the diaphragm to the open state, and the closed position moving the diaphragm to the closed state, wherein the reciprocatable member comprises a piston; and
- a coupling member coupled between the diaphragm and the reciprocatable member, wherein the coupling member has a first end and a second end opposite the first end, the first end coupled to the diaphragm and the second end coupled to the reciprocatable member via a connection that provides displacement of the coupling member relative to at least one of the reciprocatable member or the diaphragm, and the second end of the coupling member including a loop member and a pin extending through the loop member.

18. The diaphragm valve of claim 17 wherein the coupling member is configured to maintain the diaphragm in the open state while the reciprocatable member is in the open position, and wherein the coupling member has a clearance gap relative to the reciprocatable member when the reciprocatable member is in the closed position.

19. The diaphragm valve of claim 17 further comprising a fluid channel extending through the reciprocatable member and to a chamber, wherein positive fluid pressure in the chamber forces the reciprocatable member to the open position.

* * * * *